US012413019B2

(12) United States Patent
Menard et al.

(10) Patent No.: US 12,413,019 B2
(45) Date of Patent: Sep. 9, 2025

(54) ELECTRICAL POWER CONNECTOR ASSEMBLY

(71) Applicant: Aptiv Technologies AG, Schaffhausen (CH)

(72) Inventors: Pascal Menard, Villepreux (FR); Rama Krishna Manne, Guntur (IN)

(73) Assignee: APTIV TECHNOLOGIES AG, Schaffhausen (CH)

( * ) Notice: Subject to any disclaimer, the term of this patent is extended or adjusted under 35 U.S.C. 154(b) by 347 days.

(21) Appl. No.: 18/142,781

(22) Filed: May 3, 2023

(65) Prior Publication Data

US 2023/0361509 A1 Nov. 9, 2023

(30) Foreign Application Priority Data

May 6, 2022 (EP) .................................... 22172204

(51) Int. Cl.
*H01R 13/64* (2006.01)
*H01R 13/512* (2006.01)
*H01R 13/514* (2006.01)

(52) U.S. Cl.
CPC ........... *H01R 13/64* (2013.01); *H01R 13/512* (2013.01); *H01R 13/514* (2013.01); *H01R 2201/26* (2013.01)

(58) Field of Classification Search
CPC .... H01R 13/64; H01R 13/512; H01R 13/514; H01R 2201/26
USPC .................................. 439/752.5, 374, 733.1
See application file for complete search history.

(56) References Cited

U.S. PATENT DOCUMENTS 3,980,385 A * 9/1976 Hirokawa ............ H01R 13/432 439/246
5,195,913 A * 3/1993 Shattuck .............. H01R 13/432 439/246
5,350,292 A * 9/1994 Sanders .................. H01F 38/10 439/752.5
5,425,661 A * 6/1995 Self, Jr. ................ H01R 13/432 439/748
5,489,222 A * 2/1996 Moyer ................... H01R 13/40 439/246
6,165,027 A * 12/2000 Huang ................... H01R 13/41 439/752.5
8,585,446 B2 * 11/2013 Manske ................. H01R 43/18 439/752
9,450,226 B2 9/2016 Morgan et al.
9,455,523 B1 9/2016 Sundarakrishnamachari et al.
9,608,357 B1 3/2017 Sundarakrishnamachari et al.
10,116,078 B1 10/2018 Durse et al.
(Continued)

FOREIGN PATENT DOCUMENTS

CN 214673183 U 11/2021

OTHER PUBLICATIONS

Extended European Search Report for Application No. 22172204.4; mailed Oct. 20, 2022; 8 pages.

*Primary Examiner* — Gary F Paumen
(74) *Attorney, Agent, or Firm* — Billion & Armitage

(57) ABSTRACT

A spacer for maintaining one or more wires during a molding process, the spacer having an external frame, and a plurality of spring curved leaves. Each spring curved leaf has a fixed end attached to an inner face of the external frame and a free end. The free ends of the plurality of spring curved leaves are arranged to flexibly wrap the one or more wires.

11 Claims, 4 Drawing Sheets

(56) References Cited

U.S. PATENT DOCUMENTS

| | | | |
|---|---|---|---|
| 10,320,123 | B1 | 6/2019 | Sundarakrishnamachari et al. |
| 12,261,389 | B2 * | 3/2025 | Panitz .................. H01R 13/631 |
| 2018/0375227 | A1 | 12/2018 | Kaehny et al. |
| 2020/0161795 | A1 | 5/2020 | Aoki |
| 2022/0029340 | A1 | 1/2022 | Panitz |

* cited by examiner

ELECTRICAL POWER CONNECTOR ASSEMBLY

CROSS-REFERENCE TO RELATED APPLICATION

This application claims benefit of priority to European Patent Application No. 22172204.4 filed on May 6, 2022, the entire disclosure of which is hereby incorporated by reference.

TECHNICAL FIELD OF THE INVENTION

The disclosure generally relates to connector assemblies for automotive vehicles. More particularly, this disclosure relates to a connector assembly for electrically connecting electrical conductors carrying high power currents.

BACKGROUND

An example of such a connector assembly is disclosed by US Patent Application Publication 2018/0375227 A1. When connectors are used in high voltage applications, e.g., greater than 48 volts, it is desirable to prevent accidental contact with energized terminals or conductors. More particularly, access to an electrical conductor through a cavity or passage of an insulating housing protecting this electrical conductor, should be prevented. Standards, such as International Electrotechnical Commission Standard IEC 60529, require a protection (for example the so-called IPXXB protection). To meet the requirements of the IPXXB protection for example, a test joint finger of 12 mm diameter and 80 mm length should have an adequate clearance from hazardous parts. Such a requirement limits the diameter of a cavity or passage of a housing opened on an energized electrical conductor.

However, when connectors are used in high current intensity applications, heating should be limited. Therefore, there is a need for power terminals having a large cross section. But large cross-sections may not be compatible with IPXXB protection when power terminals have to be inserted through a cavity or passage of an insulating housing.

This disclosure aims at providing a connector assembly that is compatible with both an IPXXB protection and an electrical power conduction.

SUMMARY

This aim is at least partially achieved by the electrical connector assembly described herein. Indeed, thanks to such an electrical connector assembly, it is possible to use terminals with cross-sections that can correspond to diameters greater than 12 mm, so as to carry high-power currents, while limiting heating, but protection structure(s) create(s) an obstacle for a finger materialized by a cylindrical object of revolution with a diameter greater than, or equal, to 12 mm. This obstacle can be formed by only one protection structure or by a plurality of protection structures. The protection structures can be arranged in many ways. They can be arranged at the same level in the cavity with regard to the insertion direction. Alternatively, they can be arranged at various levels in the cavity with regard to the insertion direction.

According to one or more aspects of the present disclosure, an electrical connector includes a first housing part defining at least one cavity extending longitudinally along an insertion direction; a power terminal with a connection portion configured to be inserted, in the insertion direction, in the at least one cavity, the power terminal having an external and an internal cylindrical surface; and a first electrical conductor at least a portion of which is covered by the first housing part, and configured to be connected to the power terminal through the at least one cavity, when the power terminal is inserted in the at least one cavity, wherein the cavity has an internal surface from which protrudes at least one protection structure, wherein the at least one protection structure is configured to prevent the insertion, in the insertion direction, in the cavity, of a solid cylinder having a diameter equal to or greater than 12 mm, past the at least one protection structure, wherein at least one slot is defined in the external cylindrical surface, wherein the external cylindrical surface has a diameter greater than 12 mm, wherein each slot extends longitudinally parallel to the insertion direction and extends radially only over a portion of a thickness of the terminal between the external cylindrical surface and the internal cylindrical surface, and wherein the at least one protection structure can slide parallel to the insertion direction in at least one slot.

In some aspects of the electrical connector described in the preceding paragraph, the connection portion defines a hollow portion extending parallel to the insertion direction.

In some aspects of the electrical connector described in any one of the preceding paragraphs, the electrical connector further includes a bolt with a head and a rod, wherein the rod is engaged through the hollow portion and is screwed.

In some aspects of the electrical connector described in any one of the preceding paragraphs, the electrical connector further includes a second housing part covering at least a portion of a second electrical conductor which is electrically and mechanically connected to the first electrical conductor with the power terminal and the bolt.

In some aspects of the electrical connector described in any one of the preceding paragraphs, the first electrical conductor is a busbar.

In some aspects of the electrical connector described in any one of the preceding paragraphs, each protection structure is a rib extending parallel to the insertion direction and wherein each slot is configured to receive a rib.

In some aspects of the electrical connector described in any one of the preceding paragraphs, the at least one slot includes a plurality of slots symmetrically arranged around a central axis which is parallel to the insertion direction.

In some aspects of the electrical connector described in any one of the preceding paragraphs, the at least one cavity and the at least one protection structure are configured to meet International Electrotechnical Commission Standard IEC 60529 with regard to IPXXB protection.

In some aspects of the electrical connector described in any one of the preceding paragraphs, the external cylindrical surface extends over a cylinder having a diameter of 17.1 mm.

In some aspects of the electrical connector described in any one of the preceding paragraphs, the at least one cavity has an internal surface from which three ribs forming the at least one protection structure extend, wherein each rib terminates with a ridge arranged towards a central axis of the at least one cavity, wherein the ridges of the three ribs are arranged in a circle extending perpendicularly to the central axis, and wherein the diameter of the circle is less than or equal to 12 mm.

In some aspects of the electrical connector described in any one of the preceding paragraphs, each rib has an upper end which is at least at a distance of 43.2 mm from the first electrical conductor or any other electrically conducting part in electrical contact with the first electrical conductor and wherein the upper end is visible through a first cavity.

BRIEF DESCRIPTION OF THE DRAWINGS

The present invention is now described, by way of example with reference to the accompanying drawings, in which.

DETAILED DESCRIPTION

Figure 1:
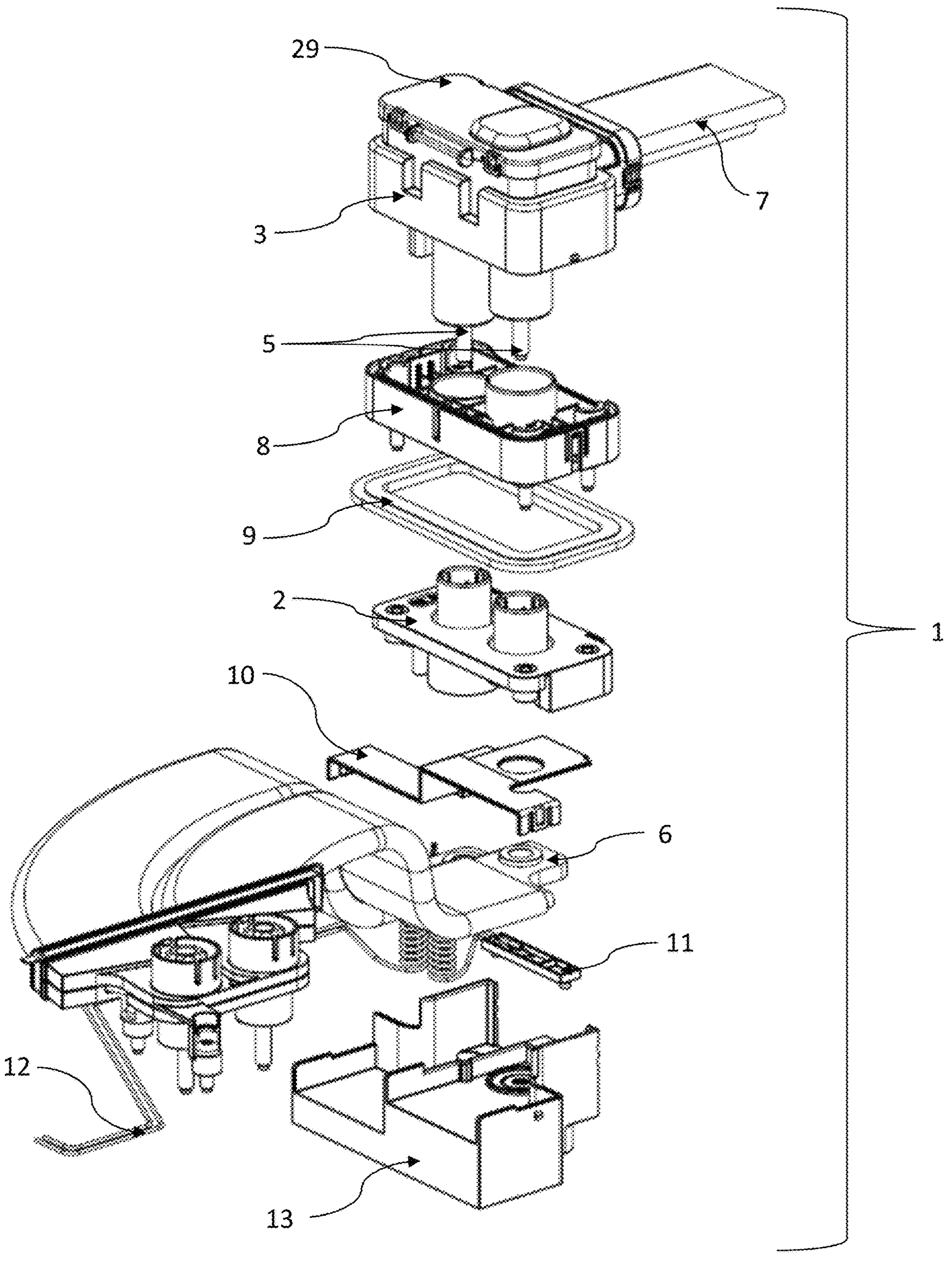
FIG. 1 is a schematic exploded view in perspective an example of an embodiment of a connector assembly according to some embodiments.

An example of an electrical connector assembly 1 for an electrical power circuit of a motor vehicle is shown in FIG. 1. The electrical connector assembly 1 comprises, amongst other elements, a first housing part 2, a second housing part 3, a power terminal 4 (not shown in FIG. 1), bolts 5, a first electrical conductor 6 and a second electrical conductor 7.

The electrical connector assembly 1 may also comprise for example a cover 29, an upper interface housing part 8, an environment part 9 (onto which the electrical connector assembly 1 is attached), a cap 10 (for protecting the first electrical conductor 6 from dust), a thermal sensor assembly 11 (connected to a circuit 12), and a bottom housing part 13.

The first housing part 2 and the second housing part 3 are made of electrically insulating material. For example, they are made of molded plastic.

Figure 2:
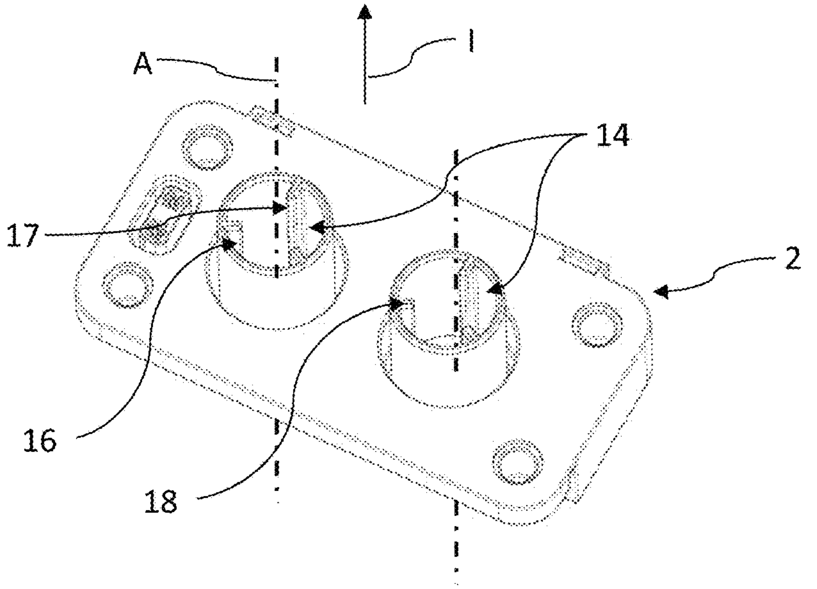
FIG. 2 shows schematically in perspective, a first housing part of the connector assembly shown in FIG. 1 according to some embodiments.

As shown in FIG. 2, the first housing part 2 comprises a plurality of first cavities 14. Each first cavity 14 extends along an insertion direction I. In the illustrated example, the first housing part 2 comprises two cavities 14. Each first cavity 14 has a general cylindrical shape of revolution around a central axis A. The central axis A is parallel to the insertion direction I. Each first cavity 14 has an internal diameter greater than 17.1 mm. Each first cavity 14 has an internal surface from which extends a plurality of ribs 16 forming protection structures. In the illustrated example, each first cavity 14 comprises three ribs 16 symmetrically arranged, with a 120-degree angle, around the central axis A. Each rib 16 extends longitudinally parallel to the insertion direction I. Each rib 16 extends radially towards the central axis A. Each rib 16 terminates towards the central axis A by a ridge 17. The ridges 17 of the three ribs 16 are arranged in a circle extending perpendicular to the central axis A. The diameter of this circle is less or equal to 12 mm. The upper end 18 of each rib 16 is at least at a distance D of 43.2 mm from the first electrical conductor 6 or any other electrically conducting part in electrical contact with the first electrical conductor 6 and that is visible through a first cavity 14 (see FIG. 5).

Figure 3:
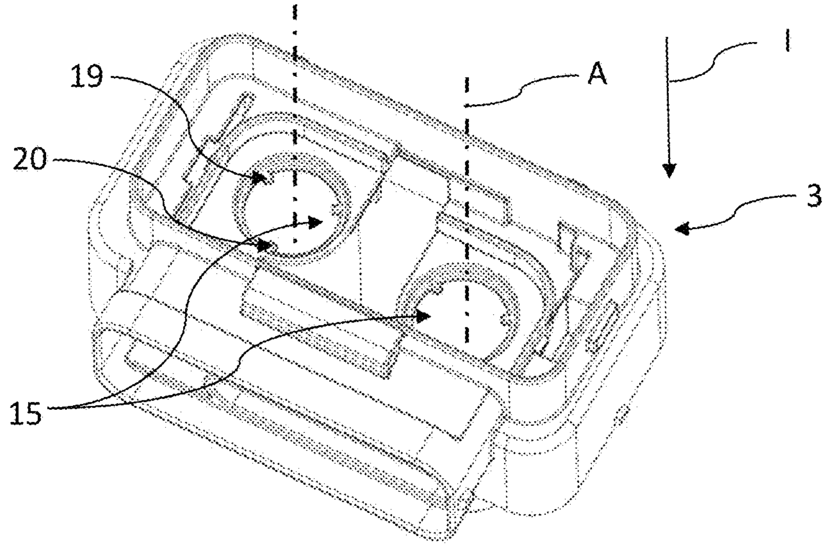
FIG. 3 shows schematically in perspective, a second housing part of the connector assembly shown in FIG. 1 according to some embodiments.

As shown in FIG. 3, the second housing part 3 comprises a plurality of second cavities 15. Each second cavity 15 extends along the insertion direction I. In the illustrated example, the second housing part 3 comprises two second cavities 15. Each second cavity 15 has a general cylindrical shape of revolution around the central axis A. Each second cavity 15 has an internal diameter greater than 17.1 mm. Each second cavity 15 has an internal surface from which extends a plurality of pins 19. The plurality of pins 19 form coding structures. In the illustrated example, each second cavity 15 comprises three pins 19 symmetrically arranged, with a 120-degree angle, around the central axis A. Each pin 19 extends radially towards the central axis A. Each pin 19 terminates towards the central axis A by a free end 20. The free ends 20 are arranged in a circle extending perpendicular to the central axis. The diameter of this circle is greater or equal to 12 mm.

Figure 4:
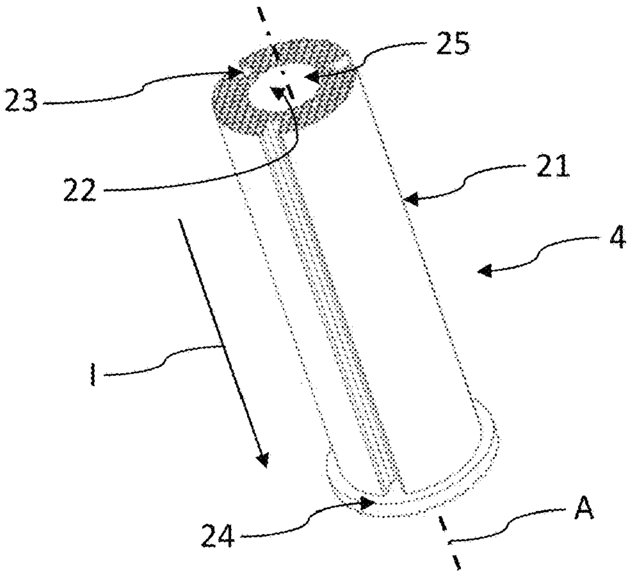
FIG. 4 shows schematically in perspective, a power terminal for the connector assembly shown in FIG. 1 according to some embodiments.

The power terminal 4 is made of electrically conducting material. As shown in FIG. 4, the power terminal 4 has a general cylindrical shape forming a connection portion and extending longitudinally parallel to the insertion direction I. The power terminal 4 has an external cylindrical surface 21 and an internal cylindrical surface 22. The external 21 and internal 22 surfaces are symmetrical around the central axis A. The internal cylindrical surface 22 defines a hollow portion 25. The external cylindrical surface 21 extends over a cylinder of 17.1 mm diameter. The external cylindrical surface 21 defines slots 23. In the illustrated example, the external cylindrical surface 21 defines three slots 23 symmetrically arranged, with a 120-degree angle, around the central axis A. Each slot 23 extends longitudinally parallel to the insertion direction I. Each slot 23 extends radially towards the central axis A. Each slot 23 is large enough (circumferentially) and deep enough (radially) for accommodating a first rib 16 or pin 19. The power terminal 4 also has a collar 24 extending radially from the external cylindrical surface 21. For connecting the first 6 and second 7 electrical conductors, the power terminal 4 is first inserted into the second cavity 15 of the second housing part 3. During this insertion, the pins 19 serve a coding means for aligning the slots 23 with the ribs 16.

Figure 5:
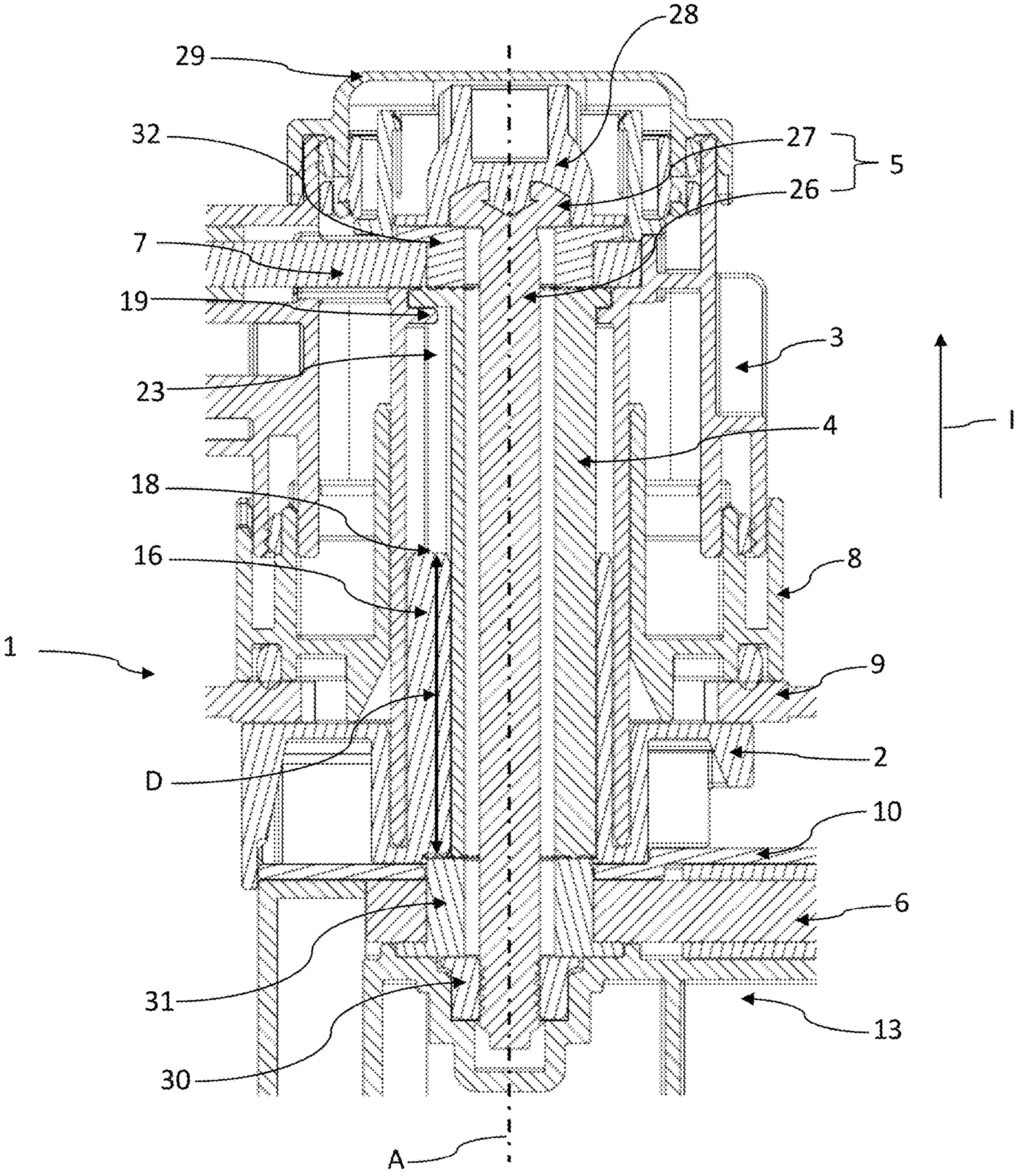
FIG. 5 is a schematic longitudinal cross-section of the connector assembly shown in FIG. 1 according to some embodiments.

As illustrated in FIG. 5, the bolt 5 has a rod 26 and a head 27. The rod 26 and the head 27 are made of an electrically conducting material. The head 27 is covered with a protective cap 28 made of an electrically insulating material. The rod 26 is inserted in the hollow portion 25.

In the illustrated example, the first electrical conductor 6 and a second electrical conductor 7 are busbars. The first electrical conductor 6 and second electrical conductor 7 may be included in an electrical power circuit of a vehicle. The first electrical conductor 6 and second electrical conductor 7 may be made for example of aluminum or copper (aluminum or copper alloy) and covered by an insulating material. A portion of the first electrical conductor 6 is covered by the first housing part 2. A portion of the second electrical conductor 7 is covered by the second housing part 3. A nut 30 is screwed onto the rod 26. A first electrically conductive ring 31 is engaged and blocked into a hole made in the first electrical conductor 6. The head 27 engages a second electrically conductive ring 32 that itself is engaged and blocked into a hole made in the second electrical conductor 7. When the bolt 5 is tightened, the power terminal 4 is in electrical contact with at least the first electrically conductive ring 31 and the second electrically conductive ring 32, that are themselves electrical contact respectively in with the first electrical conductor 6 and the second electrical conductor 7. The first 6 and second 7 electrical conductors are therefore electrically connected through a round power terminal 4 having a diameter which is greater than 12 mm.

Figure 6:
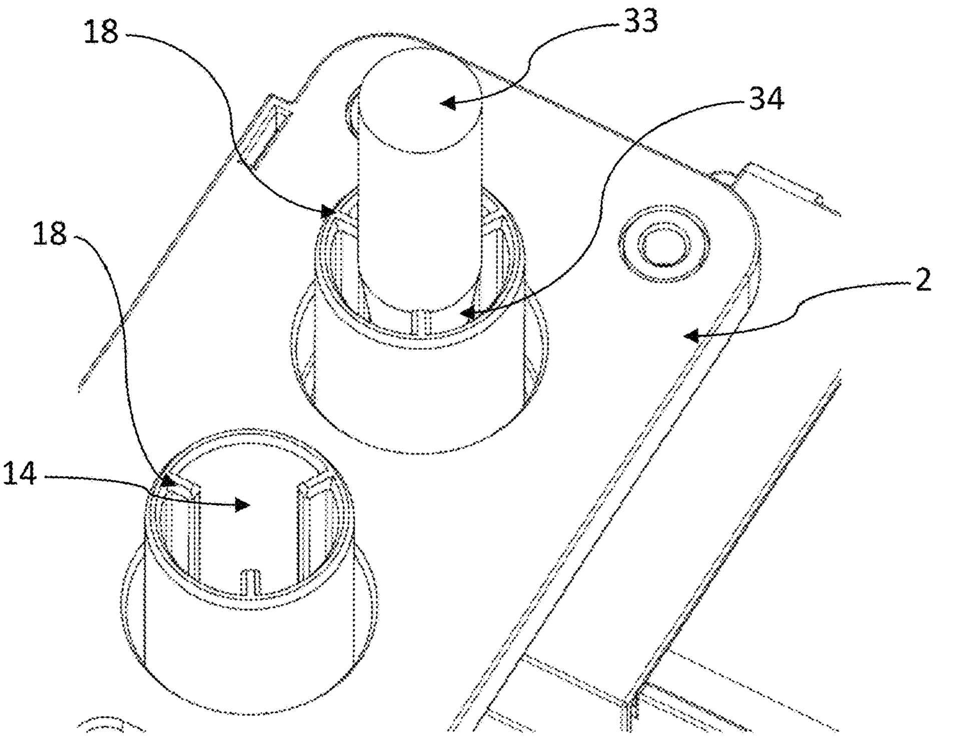
FIG. 6 shows schematically in perspective, with a test finger inserted in a cavity of the first housing part of the connector assembly shown in FIG. 1 according to some embodiments.

A test finger 33 is shown in FIG. 6. The test finger 33 has a general cylindrical shape forming a solid cylinder (terminated by tapered tip 34) having an external diameter of 12 mm. Therefore, the test finger 33 is blocked by the upper ends 18 of the ribs 16 and is therefore prevented from touching the first electrical conductor 6.

Figure 7:
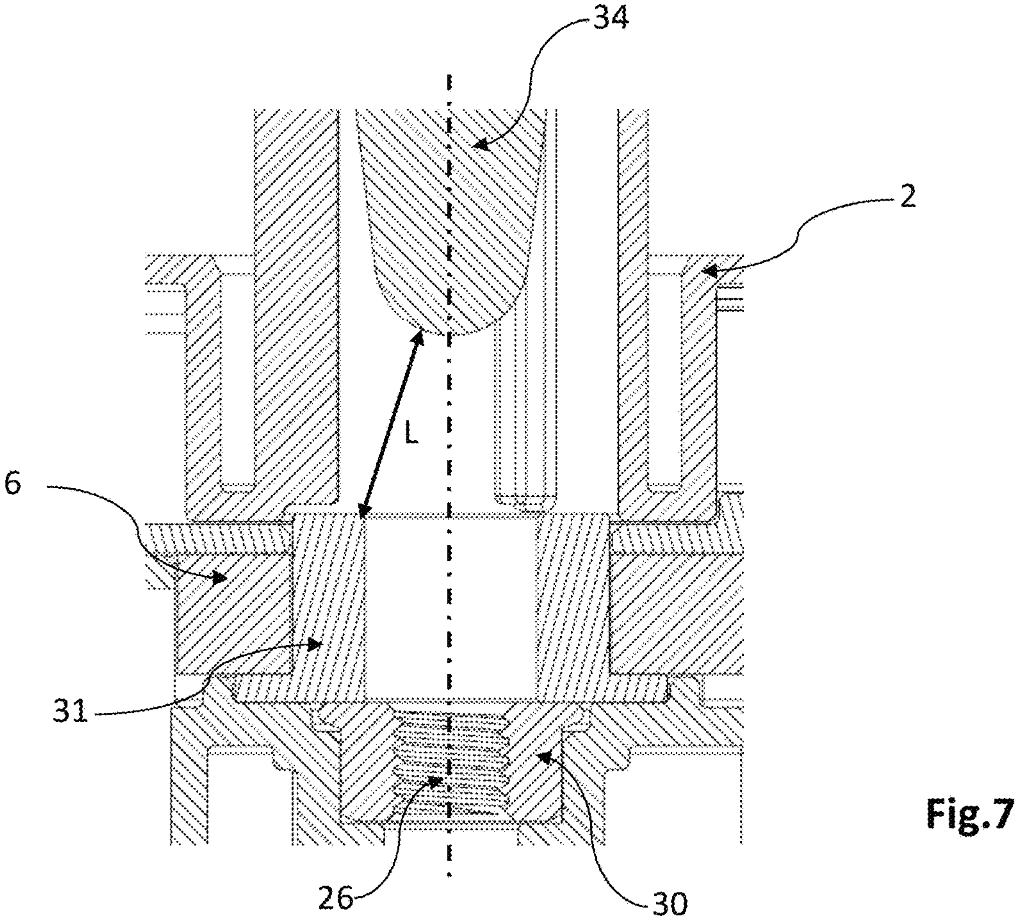
FIG. 7 is a schematic longitudinal cross-section of a detail of the connector assembly shown in FIG. 1, and a test finger inserted in one of its cavities according to some embodiments.

As illustrated in FIG. 7, the tip 34 of the test finger 33 is at a distance L of at least 10.5 mm from the first electrically conductive ring 31.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes", "including", "includes", and/or "including," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any order of arrangement, order of operations, direction or orientation unless stated otherwise.

The invention claimed is:

1. An electrical connector assembly for an electrical circuit of a motor vehicle, comprising:

- a first housing part defining at least one cavity extending longitudinally along an insertion direction;
- a power terminal with a connection portion configured to be inserted, in the insertion direction, in the at least one cavity, the power terminal having an external and an internal cylindrical surface; and
- a first electrical conductor at least a portion of which is covered by the first housing part, and configured to be connected to the power terminal through the at least one cavity, when the power terminal is inserted in the at least one cavity, wherein the cavity has an internal surface from which protrudes at least one protection structure, wherein the at least one protection structure is configured to prevent the insertion, in the insertion direction, in the cavity, of a solid cylinder having a diameter equal to or greater than 12 mm, past the at least one protection structure, wherein at least one slot is defined in the external cylindrical surface, wherein the external cylindrical surface has a diameter greater than 12 mm, wherein each slot extends longitudinally parallel to the insertion direction and extends radially only over a portion of a thickness of the terminal between the external cylindrical surface and the internal cylindrical surface, and wherein the at least one protection structure can slide parallel to the insertion direction in at least one slot.

2. The electrical connector assembly according to claim 1, wherein the connection portion defines a hollow portion extending parallel to the insertion direction.

3. The electrical connector assembly according to claim 2, further comprising a bolt with a head and a rod, wherein the rod is engaged through the hollow portion and is screwed.

4. The electrical connector assembly according to claim 3, further comprising a second housing part covering at least a portion of a second electrical conductor which is electrically and mechanically connected to the first electrical conductor with the power terminal and the bolt.

5. The electrical connector assembly according to claim 1, wherein the first electrical conductor is a busbar.

6. The electrical connector assembly according to claim 1, wherein each protection structure is a rib extending parallel to the insertion direction and wherein each slot is configured to receive a rib.

7. The electrical connector assembly according to claim 1, wherein the at least one slot comprises a plurality of slots symmetrically arranged around a central axis which is parallel to the insertion direction.

8. The electrical connector assembly according to claim 1, wherein the at least one cavity and the at least one protection structure are configured to meet International Electrotechnical Commission Standard IEC 60529 with regard to IPXXB protection.

9. The electrical connector assembly according to claim 1, wherein the external cylindrical surface extends over a cylinder having a diameter of 17.1 mm.

10. The electrical connector assembly according to claim 1, wherein the at least one cavity has an internal surface from which three ribs forming the at least one protection structure extend, wherein each rib terminates with a ridge arranged towards a central axis of the at least one cavity, wherein the ridges of the three ribs are arranged in a circle extending perpendicularly to the central axis, and wherein the diameter of the circle is less than or equal to 12 mm.

11. The electrical connector assembly according to claim 10, wherein each rib has an upper end which is at least at a distance of 43.2 mm from the first electrical conductor or any other electrically conducting part in electrical contact with the first electrical conductor and wherein the upper end is visible through a first cavity.

* * * * *